(No Model.)
J. K. PROCTOR.
WINDOW SCREEN.
No. 298,311. Patented May 6, 1884.
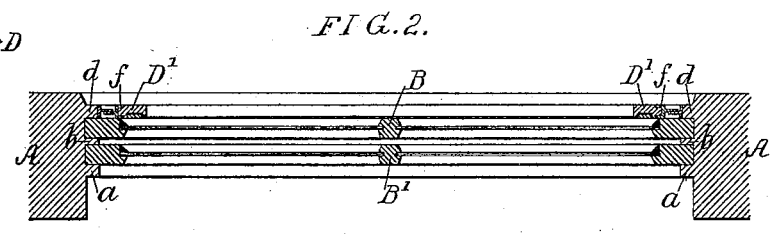
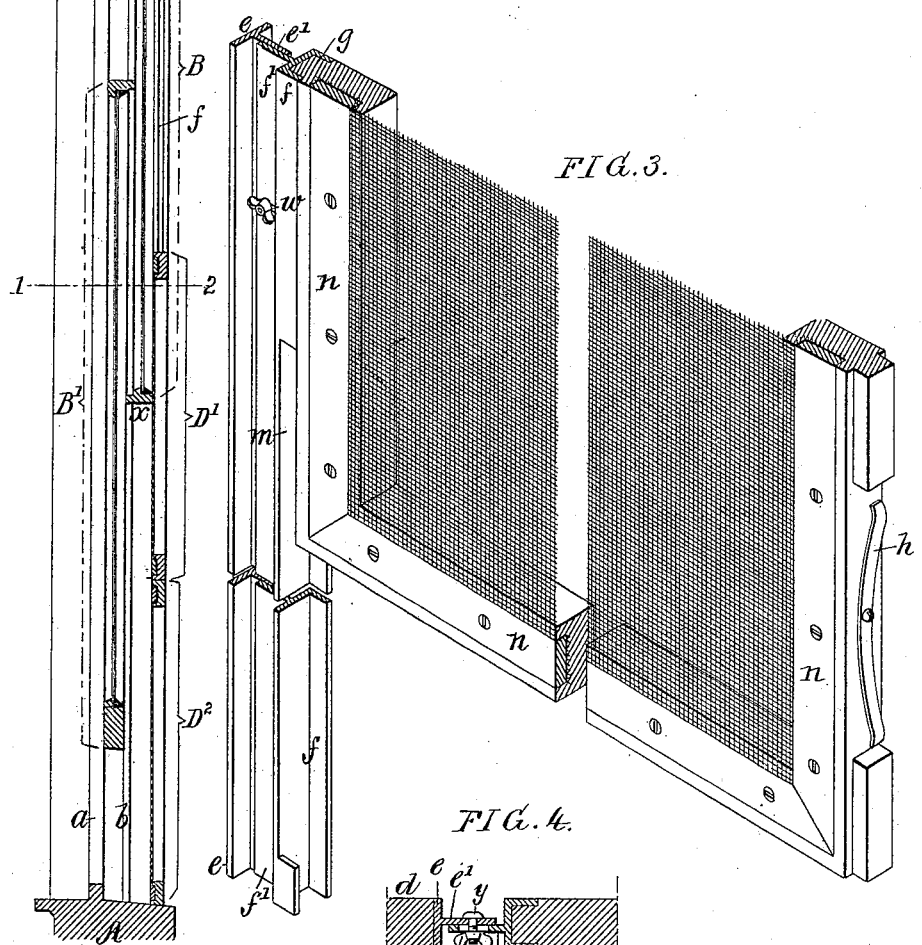
WITNESSES:
Harry L. Ashenfelter
James F. Tobin
INVENTOR:
Josiah K. Proctor
by his Attorneys
Howson & Son

UNITED STATES PATENT OFFICE.

JOSIAH K. PROCTOR, OF PHILADELPHIA, PENNSYLVANIA.

WINDOW-SCREEN.

SPECIFICATION forming part of Letters Patent No. 298,311, dated May 6, 1884.

Application filed September 13, 1883. (No model.)

*To all whom it may concern:*

Be it known that I, JOSIAH K. PROCTOR, a citizen of the United States, and a resident of Philadelphia, Pennsylvania, have invented certain Improvements in Window-Screens, of which the following is a specification.

One object of my invention is to so construct a window-screen and to so combine the same with the frame and sashes of the window that the said sashes may be raised and lowered and allowed to remain in any desired position without providing any opening for the entrance of insects, a further object being to afford an opportunity for closing and locking the outer blinds or shutters when the latter are used. These objects I attain in the manner hereinafter set forth, reference being had to the accompanying drawings, in which—

Figure 1 is a vertical section of a window frame and sashes with a screen constructed in accordance with my invention; Fig. 2, a sectional plan on the line 1 2, and Figs. 3 and 4 enlarged views of part of one of the screen-frames and of one of the guides therefor.

A represents a window-frame; B B', the upper and lower sashes, and $a$ the inner, $b$ the central, and $d$ the outer guiding-strips therefor. To the latter strips are secured bars $e$, having flanges $e'$, and to said flanges $e'$ are bolted the flanges $f'$ of grooved bars $f$, which serve as guides for a series of screen-frames, D, D', and D², ribs $g$ on the edges of which are adapted to the grooved bars $f$, the continuity of one of the ribs of each frame being interrupted, however, for the reception of a spring, $h$, Fig. 3, which bears upon the grooved bar with sufficient friction to maintain the frame in any position to which it may have been adjusted. Each bar $f$ is also recessed, as shown at $m$, Fig. 3, so that the frames can be readily applied to or removed from said bars, and each screen-frame is provided with a sheet of wire gauze or netting, the edges of which are confined to the grooved face of the frame by strips $n$. The recessing of the bar $f$, as shown, forms no part of my present invention, however, but is described and claimed in an application filed by me on the 17th day of April, 1884.

It will be observed on reference to Figs. 1 and 2 that the side bars of the frames D, D', and D² are so arranged as to fit snugly to the side rails of the upper or outer sash, B, and that the top and bottom rails of the latter bear upon and move in contact with the gauze coverings of the frames. Thus, as shown in Fig. 1, the top rail, $x$, is in contact with the covering of the frame D, which closes the upper portion of the window, and the bottom rail, $x'$, is in contact with the covering of the frame D', the latter, with the frame D², closing the lower portion of the window, so that the entrance of insects is effectually prevented. When it is desired to lower the sash B to such an extent that its top rail, $x$, is carried below the frame D, the frame D' is raised up to the frame D, so that its screen will be in contact with the top rail, $x$, of the sash B, the bottom rail, $x'$, of which is in contact with the screen of the frame D².

While the use of a screen made in three sections is preferred, two sections only may be used, if desired, both sections being raised to the top of the window when the sash is fully lowered, both sections lowered when the sash is fully raised, and one section moved to the top and the other to the bottom of the window when the sash is adjusted to the mid-position, the aggregate length of the two sections in this case being somewhat in excess of half the height of the window-opening.

The screen may, if desired, be applied to the inner guiding-strip, $a$, and may bear upon the rails of the inner sash.

The flanges $f'$ of the bars $f$ have lateral slots $w$ for the stems of the securing-bolts $y$, so that lateral adjustment of said bars $f$ is permitted, to compensate for slight inequalities in the width of the window-frame.

I claim as my invention—

1. The combination of the frame and sashes of a window with a screen made in two or more sections, guided vertically on said frame, and constructed to bear upon the rails of one of the sashes, as set forth.

2. The combination of the frame and sashes of a window with the screens D, D', and D², guided vertically on the frame, as described, and occupying the relation set forth to one of the sashes.

3. The combination of the screen-frames, the bars $e$, secured to the frame of the window, and the guide-bars $f$, secured to but laterally adjustable on the bars $e$, as set forth.

In testimony whereof I have signed my name to this specification in the presence of two subscribing witnesses.

JOSIAH K. PROCTOR.

Witnesses:
HARRY L. ASHENFELTER,
HARRY SMITH.